United States Patent
Kanda

(10) Patent No.: US 10,279,544 B2
(45) Date of Patent: May 7, 2019

(54) FORMING APPARATUS AND FORMING METHOD

(71) Applicant: FUJI XEROX CO., LTD., Tokyo (JP)

(72) Inventor: Torahiko Kanda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 489 days.

(21) Appl. No.: 14/961,081

(22) Filed: Dec. 7, 2015

(65) Prior Publication Data

US 2016/0368217 A1   Dec. 22, 2016

(30) Foreign Application Priority Data

Jun. 19, 2015   (JP) .................................. 2015-123464

(51) Int. Cl.
| | |
|---|---|
| *B29C 67/00* | (2017.01) |
| *B33Y 10/00* | (2015.01) |
| *B29C 64/112* | (2017.01) |
| *B29C 64/20* | (2017.01) |
| *B29K 105/00* | (2006.01) |
| *B33Y 30/00* | (2015.01) |

(52) U.S. Cl.
CPC ........ *B29C 67/0085* (2013.01); *B29C 64/112* (2017.08); *B29C 64/20* (2017.08); *B33Y 10/00* (2014.12); *B29K 2105/0058* (2013.01); *B33Y 30/00* (2014.12)

(58) Field of Classification Search
CPC .................................................. B29C 64/112
See application file for complete search history.

(56) References Cited

U.S. PATENT DOCUMENTS

| | | | |
|---|---|---|---|
| 6,896,839 B2* | 5/2005 | Kubo .................... | B29C 64/153 264/109 |
| 2003/0184631 A1 | 10/2003 | Suzuki et al. | |
| 2007/0026099 A1* | 2/2007 | Hagiwara ............... | B22F 3/004 425/174.4 |
| 2013/0241114 A1* | 9/2013 | Ravich ................ | B29C 67/0062 264/401 |
| 2015/0165679 A1* | 6/2015 | Goto ..................... | B29C 64/165 264/308 |
| 2015/0183168 A1* | 7/2015 | Liverman ........... | B29C 67/0088 264/401 |

FOREIGN PATENT DOCUMENTS

| | | |
|---|---|---|
| JP | 2004-314304 A | 11/2004 |
| JP | 2006-110974 A | 4/2006 |
| JP | 2010-17960 A | 1/2010 |
| JP | 2014-221538 A | 11/2014 |

\* cited by examiner

*Primary Examiner* — Galen H Hauth
(74) *Attorney, Agent, or Firm* — Sughrue Mion, PLLC

(57) ABSTRACT

Provided is a forming apparatus including an operating section that includes a base portion, a forming unit that includes an ejection unit having an ejection surface from which a droplet of a light curing forming liquid is ejected toward the base portion, that moves relatively with respect to the base portion, and that forms a three-dimensional object on the base portion by repeating both of ejection of the droplet and curing the droplet with an irradiation beam, and a reduction unit that disposes a reduction section, which reduces an amount of light reflected toward the ejection surface, around the three-dimensional object in the operating section.

4 Claims, 16 Drawing Sheets

FORMING APPARATUS AND FORMING METHOD

CROSS-REFERENCE TO RELATED APPLICATIONS

This application is based on and claims priority under 35 USC 119 from Japanese Patent Application No. 2015-123464 filed Jun. 19, 2015.

BACKGROUND

Technical Field

The present invention relates to a forming apparatus and a forming method.

SUMMARY

According to an aspect of the invention, there is provided a forming apparatus including:

an operating section that includes a base portion;

a forming unit that includes an ejection unit having an ejection surface from which a droplet of a light curing forming liquid is ejected toward the base portion, that moves relatively with respect to the base portion, and that forms a three-dimensional object on the base portion by repeating both of ejection of the droplet and curing the droplet with an irradiation beam; and a reduction unit that disposes a reduction section, which reduces an amount of light reflected toward the ejection surface, around the three-dimensional object in the operating section.

BRIEF DESCRIPTION OF THE DRAWINGS

Exemplary embodiments of the present invention will be described in detail based on the following figures, wherein.

DETAILED DESCRIPTION

First Exemplary Embodiment

A forming apparatus according to a first exemplary embodiment of the invention is described. Arrow X represents an apparatus width direction, arrow Y represents an apparatus depth direction orthogonal to the apparatus width direction, and arrow Z represents an apparatus height direction. The apparatus width direction (X direction), the apparatus depth direction (Y direction), and the apparatus height direction (Z direction) are orthogonal to one another.

Overall Configuration

An overall configuration of a forming apparatus 10 is described.

Figure 1:
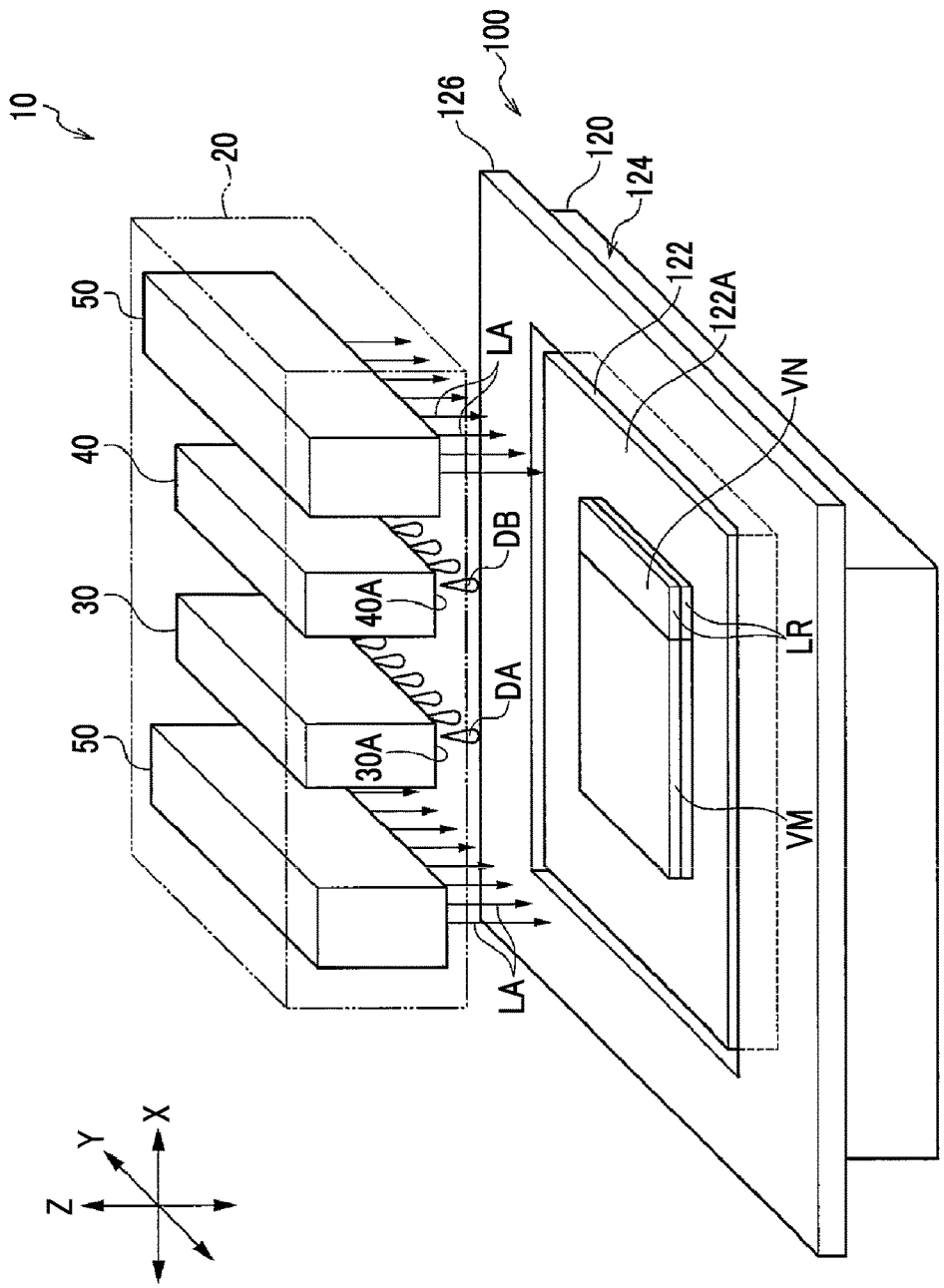
FIG. 1 is a perspective view schematically showing a configuration of a forming apparatus of a first exemplary embodiment.
Figure 4:
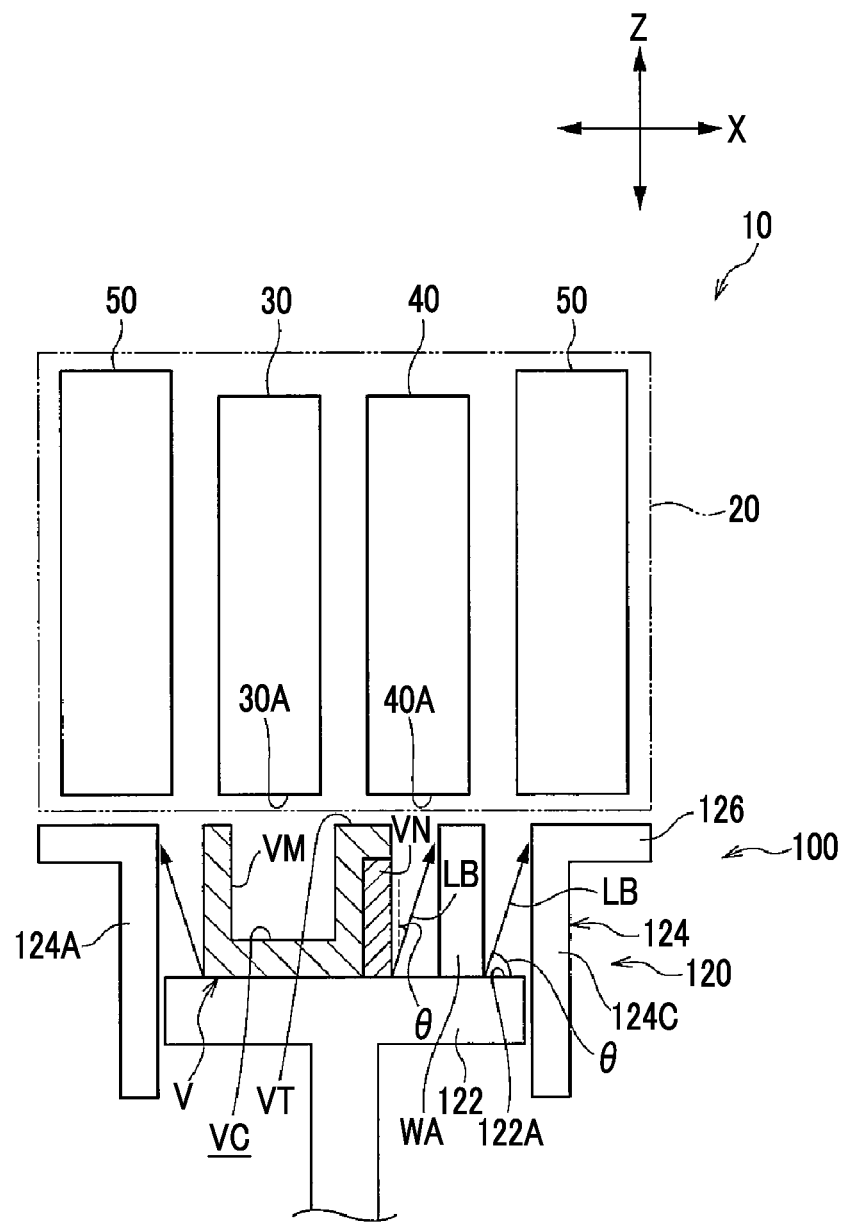
FIG. 4 is a view showing a state, in which a beam-blocking wall is formed in the forming apparatus in FIG. 2, and a reflected beam, when viewed in a Y direction.

The forming apparatus 10 of the present exemplary embodiment as shown in FIG. 1 is a so-called 3D printer in which a droplet DA of a model material and a droplet DB of a support material are ejected, layers LR, which are formed by irradiating and curing the model material and the support material with an irradiation beam LA, are stacked, a three-dimensional object V is formed on a worktable 122 as shown in FIG. 4, and then, a three-dimensional object VM having a desired shape is formed by removing a support portion VN. In a case where the three-dimensional object VM, as will be described below, does not have a portion under which a space is formed, the support portion VN is not formed. In addition, a recessed portion VC is formed (refer to FIG. 5A) at the center of the three-dimensional object VM (three-dimensional object V) of the present exemplary embodiment. In addition, a beam-blocking wall WA will be described below.

Figure 3:
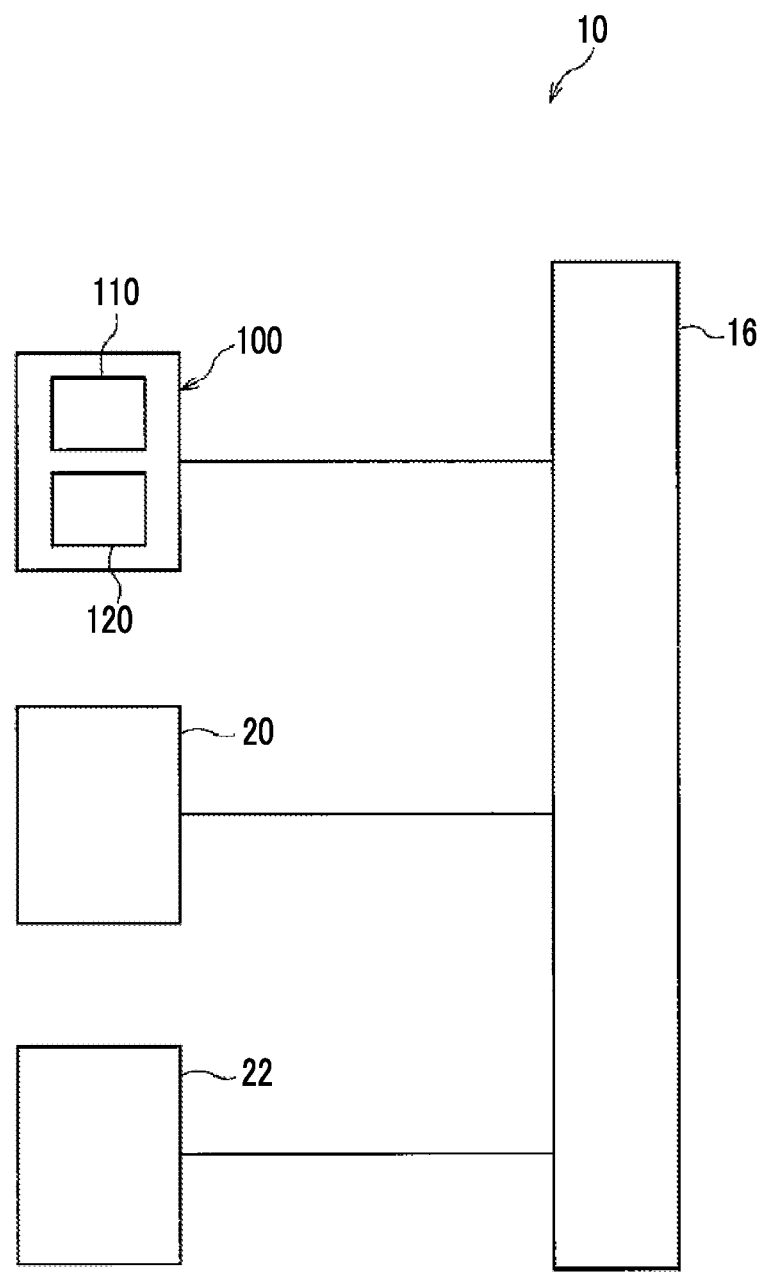
FIG. 3 is a block diagram of the forming apparatus of the first exemplary embodiment.

As shown in FIG. 3, the forming apparatus 10 is configured to include an operating mechanism 100, a forming unit 20, a moving unit 22, and a control unit 16. The control unit 16 is an example of a reduction unit along with a model material ejection head 30 and a support material ejection head 40, to be described below.

Operating Mechanism

Figure 2:
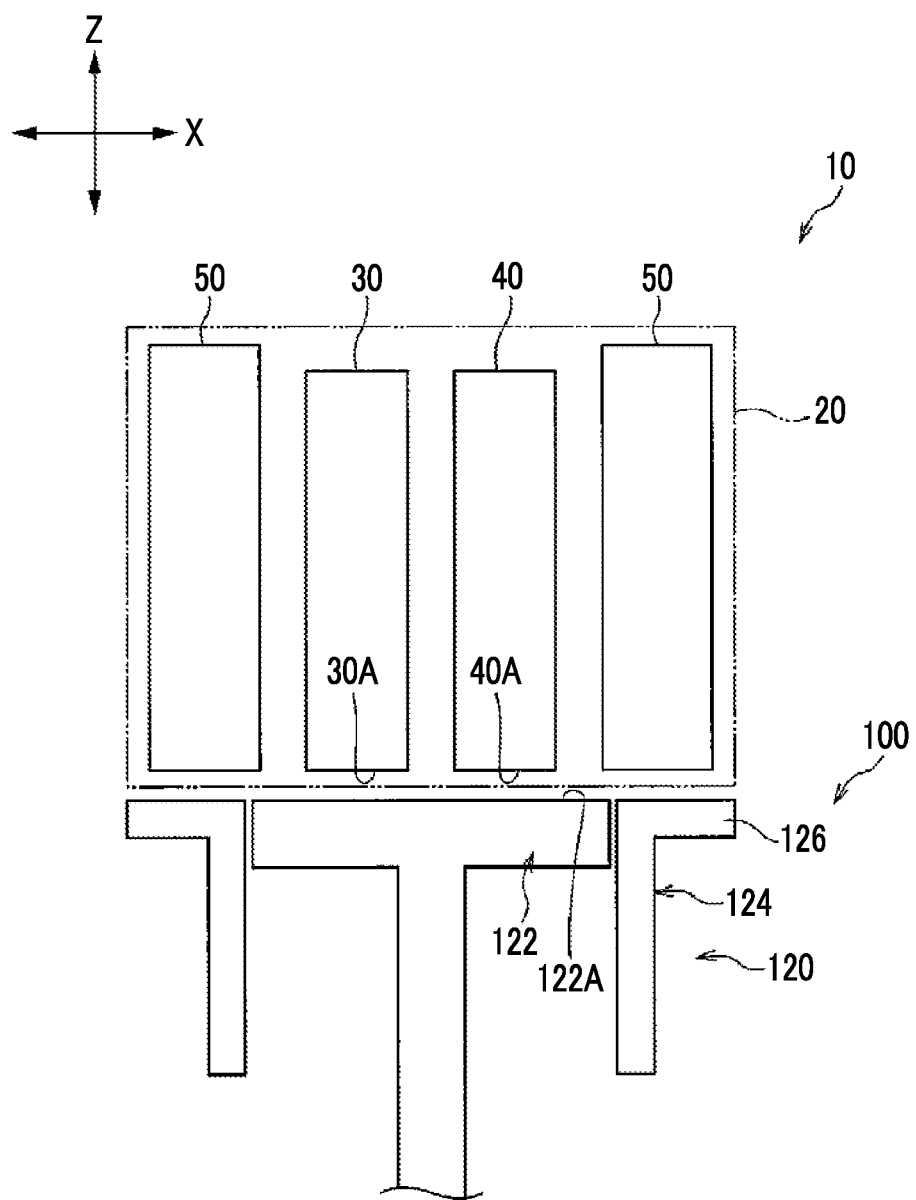
FIG. 2 is a view schematically showing the forming apparatus of the first exemplary embodiment, when viewed in a Y direction.

As shown in FIG. 1 to FIG. 3, the operating mechanism 100 is configured to include a drive unit 110 (refer to FIG. 3) and an operating section 120.

Operating Section

As shown in FIG. 1, FIG. 2, and FIG. 4, the operating section 120 is configured to include the worktable 122 as an example of a base portion and a wall section 124 provided around the worktable 122.

The worktable 122 has a top surface which corresponds to a base surface 122A on which a three-dimensional object V (refer to FIG. 4) is formed. In addition, a flange 126 which extends to the outer sides in the apparatus width direction and in the apparatus depth direction is provided on an upper end portion of the wall section 124.

The worktable 122 and the wall section 124 which configure the operating section 120 are coated in black such that the irradiation beam LA is unlikely to be reflected therefrom. In addition, it is desirable that the coating is provided with a matte finish.

Drive Unit

The drive unit 110 shown in FIG. 3 has a function of causing the overall operating section 120 to move in the apparatus width direction (X direction), and the apparatus depth direction (Y direction), and causing the worktable 122 (refer to FIG. 1, FIG. 2, or the like) alone to move in the apparatus height direction (Z direction).

Forming Unit

As shown in FIG. 1 and FIG. 2, the forming unit 20 includes the model material ejection head 30 as an example of an ejection unit, and the support material ejection head 40 as an example of an ejection unit, and an irradiation unit 50.

Model Material Ejection Head and Support Material Ejection Head

As shown in FIG. 1, the model material ejection head 30 and the support material ejection head 40 are long in length and are disposed to have a longitudinal direction thereof that is parallel to the apparatus depth direction (Y direction). In addition, the model material ejection head 30 and the support material ejection head 40 are disposed to be adjacent in the apparatus width direction (X direction).

As shown in FIG. 1 and FIG. 2, the model material ejection head 30 ejects the droplet DA (refer to FIG. 1) of a model material as an example of a forming liquid for forming the three-dimensional object VM (refer to FIG. 4). In addition, the support material ejection head 40 ejects the droplet DB of a support material as an example of a forming liquid for forming the support portion VN (refer to FIG. 4) which supports forming of the three-dimensional object VM that is formed of the model material.

The model material ejection head 30 and the support material ejection head 40 according to the present exemplary embodiment have the same configuration except that different forming liquids are ejected, respectively.

Under surfaces of the model material ejection head 30 and the support material ejection head 40 toward the base surface 122A of the worktable 122 are referred to as an ejection surface 30A and an ejection surface 40A on which multiple nozzles (not shown) are arranged in zigzag lines, respectively, from one end side to the other end side in the longitudinal direction (Y direction). The model material ejection head 30 and the support material ejection head 40 are configured to eject the droplet DA and the droplet DB, respectively, from the multiple nozzles (not shown).

Here, the model material (droplet DA) and the support material (droplet DB) are examples of a liquid (forming liquid) including a light curing resin. The light curing resin of the present exemplary embodiment is an ultraviolet curing resin having a property to perform curing by absorbing ultraviolet beams.

Moving Unit

The moving unit 22 (refer to FIG. 3) has a function of causing the forming unit 20 to move. The forming unit 20 is configured to move to a maintenance station (home position) (not shown) by the moving unit 22 after a forming operation and during the forming operation and to perform various maintenance operations such as cleaning to prevent nozzle clogging of the model material ejection head 30 and the support material ejection head 40.

Irradiation Unit

As shown in FIG. 1, the irradiation unit 50 is long and is disposed to have a longitudinal direction thereof that is parallel to the apparatus depth direction (Y direction). In addition, the irradiation units 50 are disposed on both outer sides in the apparatus width direction (X direction) to be adjacent to the model material ejection head 30 and the support material ejection head 40, respectively.

The irradiation unit 50 is configured to perform irradiation with the irradiation beam LA toward the base surface 122A of the worktable 122 from one end side to the other end side in the longitudinal direction (Y direction). The irradiation of the droplet DA and the droplet DB, which are ejected from the model material ejection head 30 and the support material ejection head 40 and land on the base surface 122A, is performed with the irradiation beam LA and thereby, the droplet DA (model material) and the droplet DB (support material) are cured.

In the irradiation unit 50 of the present exemplary embodiment, a beam source (not shown) which emits an ultraviolet beam is configured to include multiple LEDs (not shown) arranged in the apparatus depth direction (Y direction).

Control Unit

The control unit 16 has a function of controlling the overall forming apparatus 10. A specific function of the control unit 16 will be described in a forming operation (forming method of the three-dimensional object VM) of the forming apparatus 10 to be described below.

Forming Method of Three-Dimensional Object

Next, an example of the forming method of the three-dimensional object VM by the forming apparatus 10 of the present exemplary embodiment will be described.

As shown in FIG. 1 and FIG. 4, the forming apparatus 10 stacks the layers LR (refer to FIG. 1) which are formed by irradiating and curing the model material and the support material with the irradiation beam LA and forms the three-dimensional object V (refer to FIG. 4) on the base surface 122A of the worktable 122.

As shown in FIG. 4, the support portion VN is formed of the support material under a portion of the three-dimensional object VM, under which a space is formed, such that the three-dimensional object V is formed while being supported by the support portion VN. Finally, the support portion VN is removed from the three-dimensional object V and a three-dimensional object VM having a desired shape is completely formed.

Hereinafter, the forming method will be described in detail.

First, when the control unit 16 (refer to FIG. 3) receives data from an external apparatus, the control unit 16 converts data (that is, data of three dimensions) of the three-dimensional object VM and the support portion VN (constituting the three-dimensional object V), which is included in the received data, into data (that is, data of two dimensions) of multiple layers LR (refer to FIG. 1).

Subsequently, the control unit 16 controls the drive unit 110 such that the overall operating section 120 moves with respect to the forming unit 20 in the apparatus width direction (X direction) and the droplet DA (model material) and the droplet DB (support material) are ejected from the model material ejection head 30 and the support material ejection head 40 which constitute the forming unit 20. In addition, the control unit 16 causes the operating section 120 to move in the apparatus width direction (X direction) and causes the irradiation unit 50 to irradiate the droplet DA (model material) and the droplet DB (support material), which have landed, with the irradiation beam LA.

The droplet DA and the droplet DB ejected from the model material ejection head 30 and the support material ejection head 40 are irradiated and cured with the irradiation beam LA when the droplets land on the base surface 122A of the worktable 122 and the base surface 122A is moved below the irradiation unit 50. In this manner, the first layer LR is formed by scanning in one direction.

Subsequently, the control unit 16 controls the drive unit 110 such that only the worktable 122 of the operating section 120 moves to the downstream side in the apparatus height direction (Z direction) by a distance corresponding to a thickness of the layer LR.

Similarly, the control unit 16 controls the drive unit 110 such that the overall operating section 120 moves with respect to the forming unit 20 in the apparatus width direction, the droplet DA and the droplet DB are ejected from the model material ejection head 30 and the support material ejection head 40 which constitute the forming unit 20, the irradiation unit 50 irradiates and cures the droplet DA and the droplet DB, which have landed, with the irradiation beam LA, and the second layer LR is formed.

The ejection of the droplet DA and the droplet DB and the curing of the droplet DA and the droplet DB by the irradiation with the irradiation beam LA are repeated and thereby, the layers LR are stacked on the worktable 122 and the three-dimensional object V is formed. Then, as described above, the support portion VN is removed from the three-dimensional object V and the three-dimensional object VM having the desired shape is obtained. In a case where the three-dimensional object VM does not have a portion under which the space is formed, the support portion VN is not formed and thus, the droplet DB is not ejected from the support material ejection head 40.

Control of Main Components

Figure 5A:
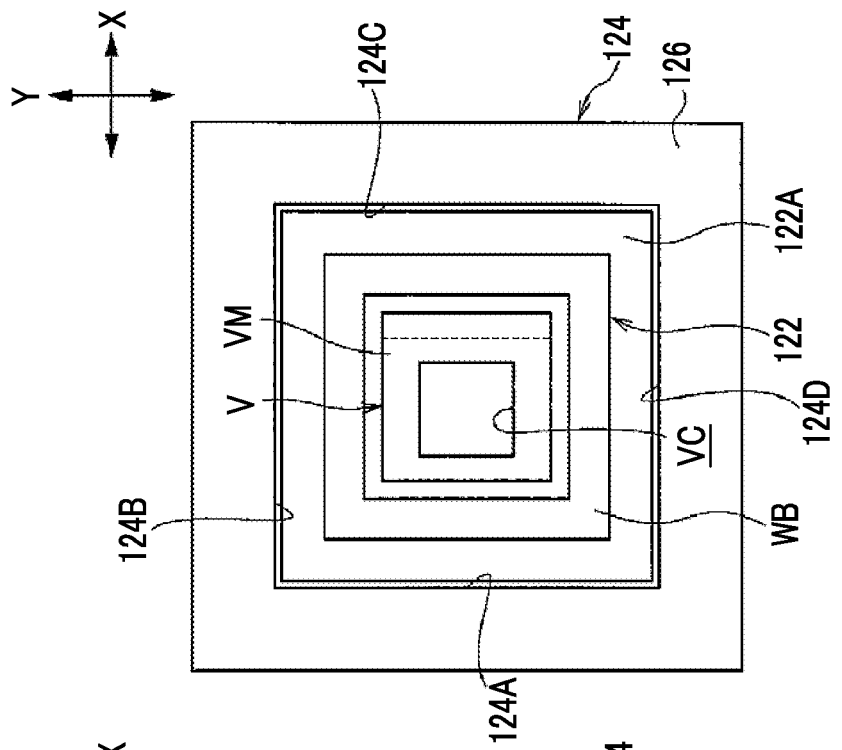
FIG. 5A is a view schematically showing a state in which the beam-blocking wall in FIG. 4 is formed, when viewed in a Z direction.

As shown in FIG. 4 and FIG. 5A, in the present exemplary embodiment, in a case (refer to a comparative example in FIG. 7) where the three-dimensional object V is small and there is a wide gap between the three-dimensional object and the wall section 124, the control unit 16 (refer to FIG. 3) performs control such that the three-dimensional object V is formed to be close to a wall section 124A and a wall section 124B (FIG. 5A) and, similar to the three-dimensional object V, a beam-blocking wall WA as an example of a reduction section is formed with the droplet DA and the droplet DB between the three-dimensional object V and both a wall section 124C and a wall section 124D (refer to FIG. 5A). As shown in FIG. 5A, in the present exemplary embodiment, the beam-blocking wall WA is substantially L-shaped in a plan view.

The beam-blocking wall WA is formed with one or both of the model material (the model material ejection head 30) and the support material (the support material ejection head 40).

The beam-blocking wall WA is formed to have a greater height from the worktable 122 along with the formation of the three-dimensional object V. As shown in FIG. 4, the height of the beam-blocking wall WA is formed to have substantially the same height as a top portion VT of the three-dimensional object V or to be slightly lower than the top portion VT.

Figure 6:
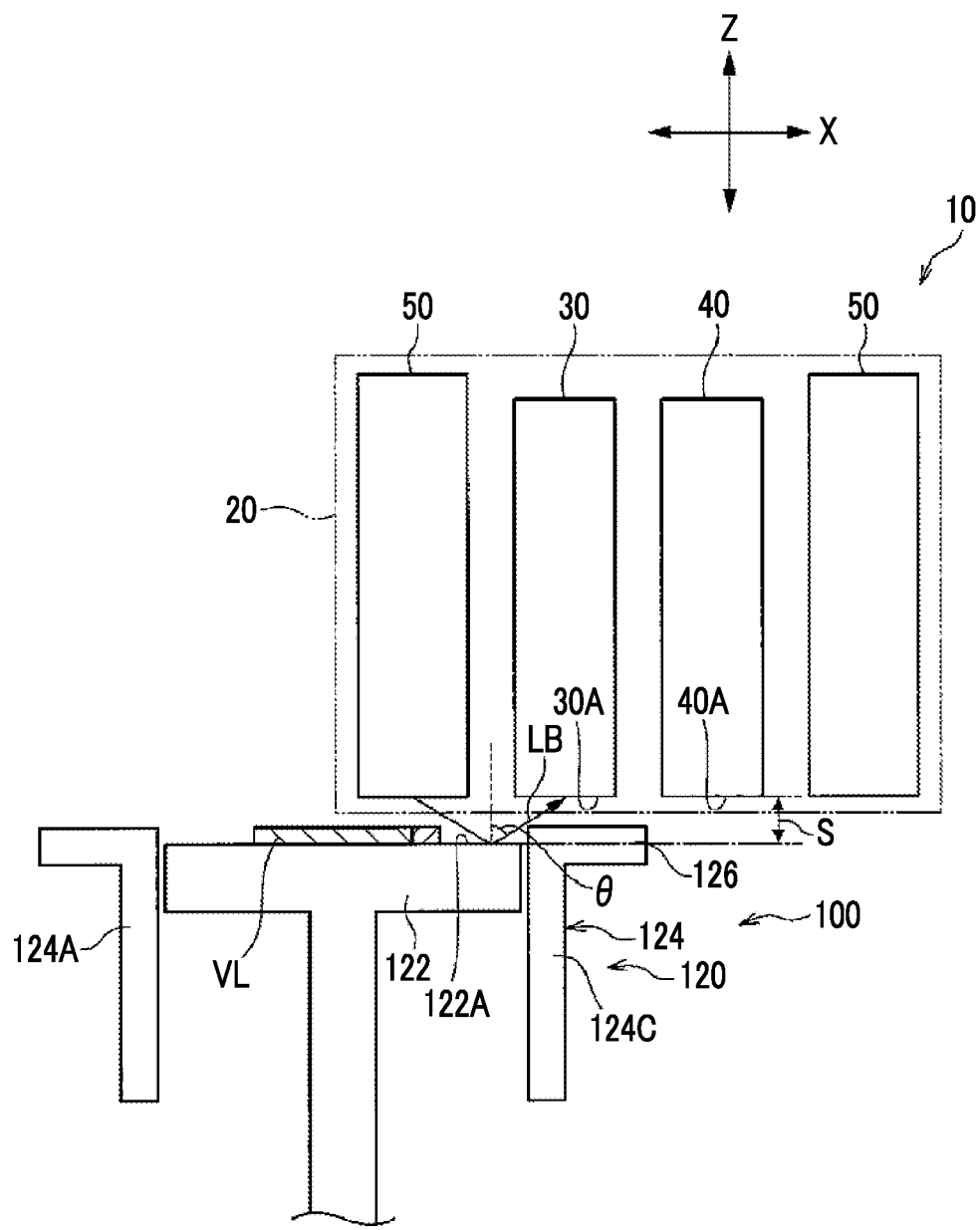
FIG. 6 is a view showing a reflected beam in a state in which an ejection surface approaches a worktable at the beginning of forming a three-dimensional object, when viewed in the Y direction.
Figure 7:
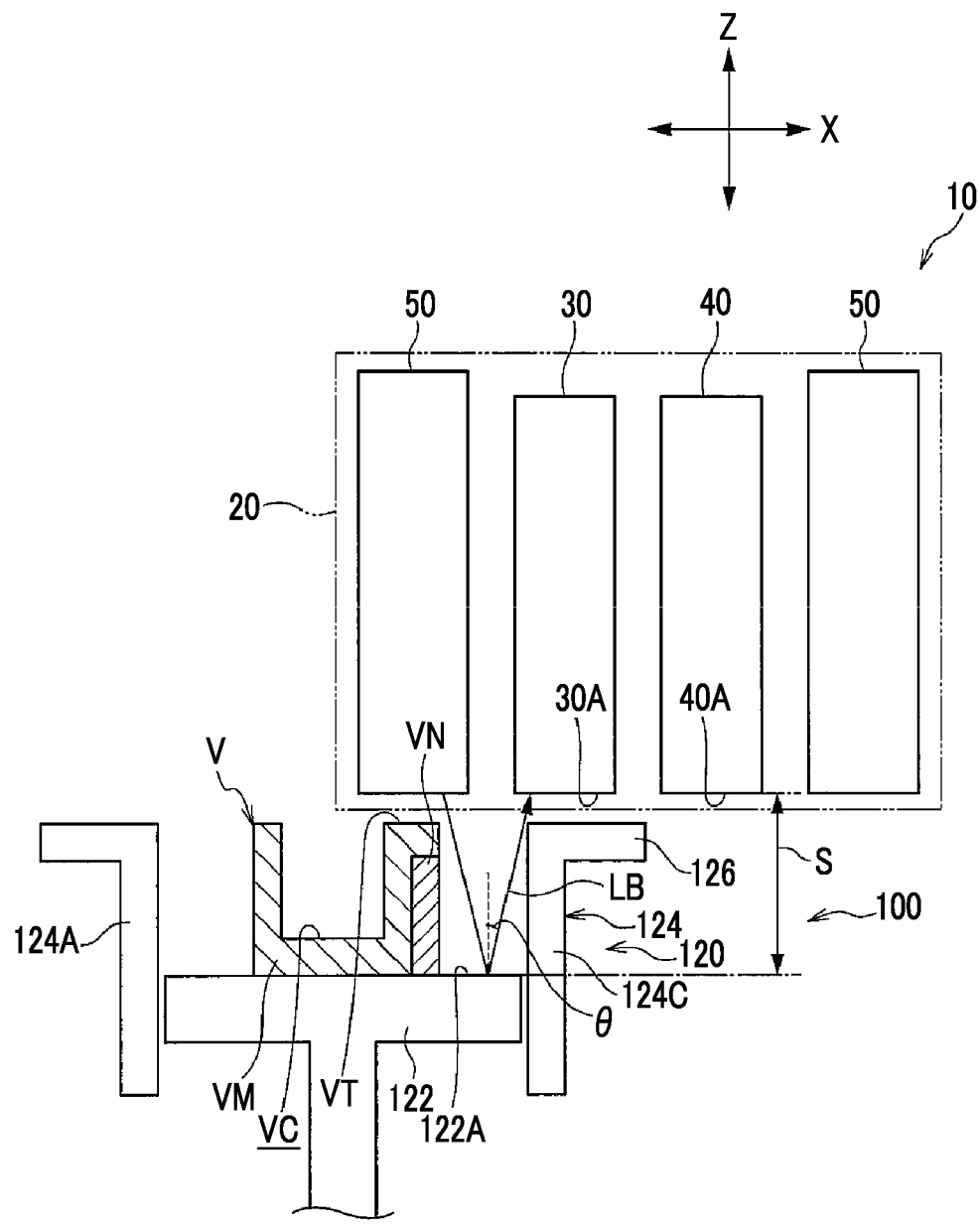
FIG. 7 is a view showing a reflected beam in a state in which the ejection surface is separated from the worktable at a completion state of forming the three-dimensional object, when viewed in the Y direction.

Here, as shown in FIG. 6 and FIG. 7, along with the formation of the three-dimensional object V, the gap is widened between the base surface 122A of the worktable 122 and both the ejection surface 30A of the model material ejection head 30 and the ejection surface 40A of the support material ejection head 40. Then, an angle $\theta$ of a reflected beam LB toward the ejection surface 30A of the model material ejection head 30 and the ejection surface 40A of the support material ejection head 40 is changed.

Accordingly, as shown in FIG. 4, when the beam-blocking wall WA is described from a different perspective, the beam-blocking wall WA is disposed at a position, at which the reflected beam LB is blocked, corresponding to the change of the angle $\theta$ of the reflected beam LB toward the ejection surface 30A of the model material ejection head 30 and the ejection surface 40A of the support material ejection head 40 along with the formation of the three-dimensional object V.

Operations

Next, operations of the present exemplary embodiment will be described.

In the case of the comparative example in which the beam-blocking wall WA shown in FIG. 6 and FIG. 7 is not formed, the ejection surface 30A of the model material ejection head 30 and the ejection surface 40A of the support material ejection head 40 are irradiated with the reflected beam (stray light) LB from the worktable 122 or the three-dimensional object V. When the ejection surface 30A of the model material ejection head 30 and the ejection surface 40A of the support material ejection head 40 are irradiated with the reflected beam, there is a concern that a problem such as nozzle clogging will arise due to the curing of the model material and the support material.

However, in the present exemplary embodiment, as shown in FIG. 4, the beam-blocking wall WA is formed around the three-dimensional object V to have a greater height from the base surface 122A of the worktable 122 along with the formation of the three-dimensional object V. In other words, the beam-blocking wall WA is disposed at the position, at which the reflected beam LB is blocked, corresponding to the change of the angle $\theta$ of the reflected beam LB toward the ejection surface 30A of the model material ejection head 30 and the ejection surface 40A of the support material ejection head 40 along with the formation of the three-dimensional object V.

Accordingly, since the reflected beam LB, with which the ejection surface 30A of the model material ejection head 30 and the ejection surface 40A of the support material ejection head 40 are irradiated, is blocked, an amount of the reflected beam LB is decreased and, as a result, a problem such as the nozzle clogging due to the curing of the model material on the ejection surface 30A of the model material ejection head 30 and the support material on the ejection surface 40A of the support material ejection head 40 is prevented or suppressed.

Figure 8:
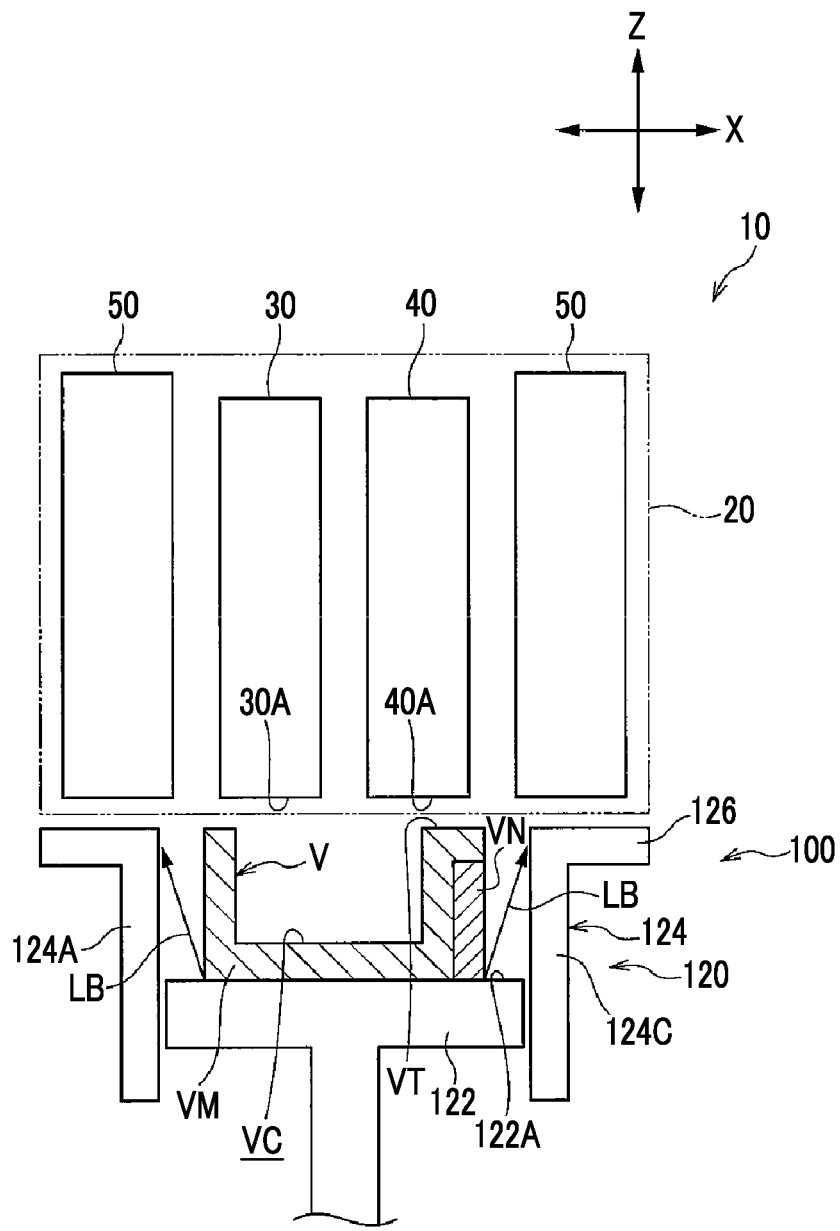
FIG. 8 is a view schematically showing a reflected beam in a case where a three-dimensional object is large in size and a beam-blocking wall is not formed in the forming apparatus in FIG. 2, when viewed in the Y direction.

As shown in FIG. 8, in a case where the gap between the three-dimensional object V and the wall section 124 is narrow such that the ejection surface 30A of the model material ejection head 30 and the ejection surface 40A of the support material ejection head 40 are not irradiated with the reflected beam (stray light) LB from the worktable 122 or the three-dimensional object V, or the amount of the reflected beam LB is less than a preset beam amount, the control unit 16 causes the beam-blocking wall WA (refer to FIG. 4) not to be formed. The size of the gap between the three-dimensional object V and the wall section 124, with which the beam-blocking wall WA is (or is not) formed, is obtained through simulations or experiments in advance and is stored in the control unit 16.

In addition, in the present exemplary embodiment, as shown in FIG. 5A, in the case where the gap between the three-dimensional object V and the wall section 124 is narrow, the control unit 16 performs control such that the three-dimensional object V is formed to be close to the wall sections 124A and 124B and the substantially L-shaped beam-blocking wall WA is formed between the three-dimensional object V and the wall sections 124C and 124D.

Figure 5B:
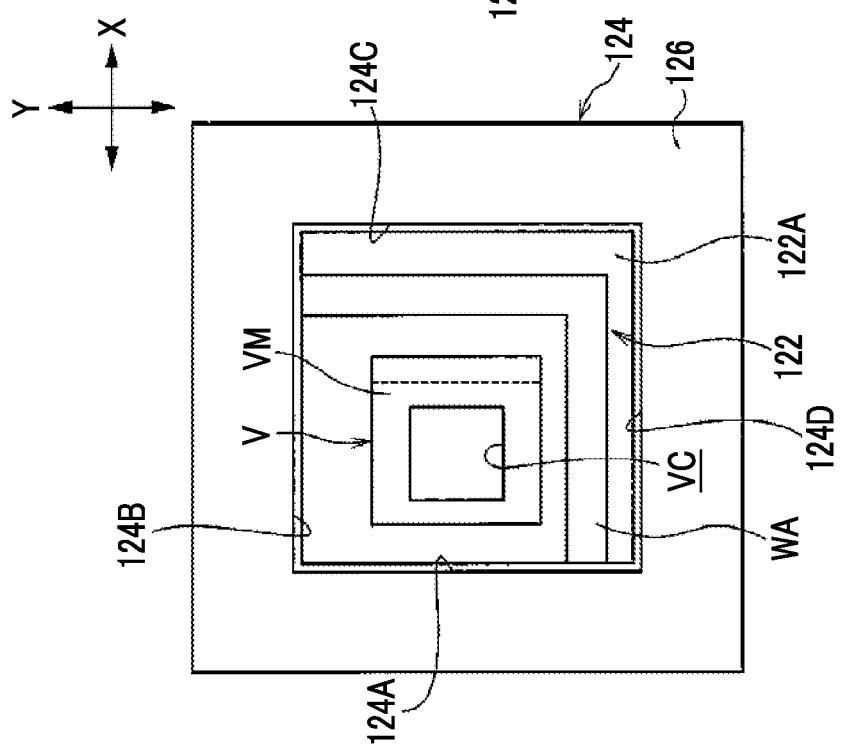
FIG. 5B is a view showing an example of a forming method of a beam-blocking wall in another way, when viewed in the Z direction.

However, as shown in FIG. 5B, the three-dimensional object V may be formed at the center and a beam-blocking wall WB may be formed between the three-dimensional object V and the wall section 124 to have a rectangular frame shape in a plan view.

In addition, although not shown in the figures, multiple beam-blocking walls may be provided between the three-dimensional object V and the wall section 124.

In short, a beam-blocking wall may be appropriately formed around the three-dimensional object V on the worktable 122 such that the reflected beam LB, with which the ejection surface 30A of the model material ejection head 30 and the ejection surface 40A of the support material ejection head 40 are irradiated, is blocked and the beam amount is reduced.

Modification Example

Next, a modification example of the present exemplary embodiment will be described.

In the exemplary embodiment described above, similar to the three-dimensional object V, the beam-blocking wall WA or WB is formed around the three-dimensional object V on the worktable 122 with one or both of the model material (the model material ejection head 30) and the support material (the support material ejection head 40). However, the beam-blocking wall may be formed by other methods. Next, modification examples in which the beam-blocking wall is formed by the other methods will be described.

First Modification Example

Although not shown in the figures, in the first modification example, in addition to the model material ejection head 30 and the support material ejection head 40, a beam-blocking material ejection head is provided to eject a droplet of a beam-blocking material (forming liquid) with which the beam-blocking wall WA and WB are formed.

It is desirable that the beam-blocking material is a material from which the irradiation beam LA is further unlikely to be reflected than from the model material and the support material, and which is obtained at a low cost.

Second Modification Example

Figure 9:
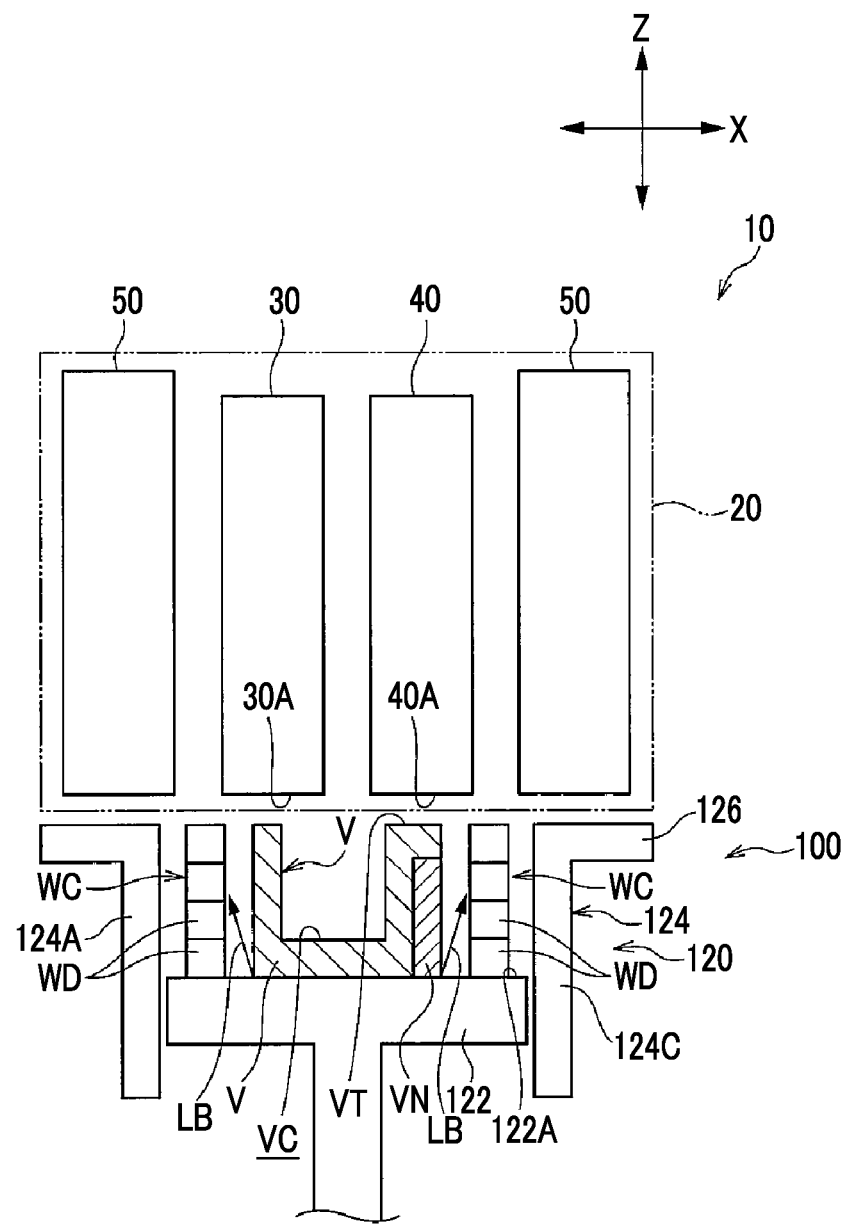
FIG. 9 is a view showing main components of a second modification example of the forming apparatus of the first exemplary embodiment, which correspond to those in FIG. 2, when viewed in the Y direction.

As shown in FIG. 9, in the second modification example, a beam-blocking wall WC is provided by stacking blocks WD in order around the three-dimensional object V along with the formation of the three-dimensional object V (matching the height of the three-dimensional object V).

It is desirable that the block WD is made of a material from which the reflected beam LB is more unlikely to be reflected than from the model material and the support material and, in the present exemplary embodiment, the block WD is formed of a porous resin such as a black resin sponge.

The blocks WD are stacked using any method. For example, the blocks WD may be appropriately stacked by an automatic stacking apparatus such as a so-called robot that may stack the blocks WD or the blocks WD may be appropriately stacked by an operator.

Second Exemplary Embodiment

A forming apparatus according to the second exemplary embodiment of the invention is described. The same reference sign is assigned to the same member as in the first exemplary embodiment and a repetitive description thereof is omitted.

Overall Configuration

Figure 10:
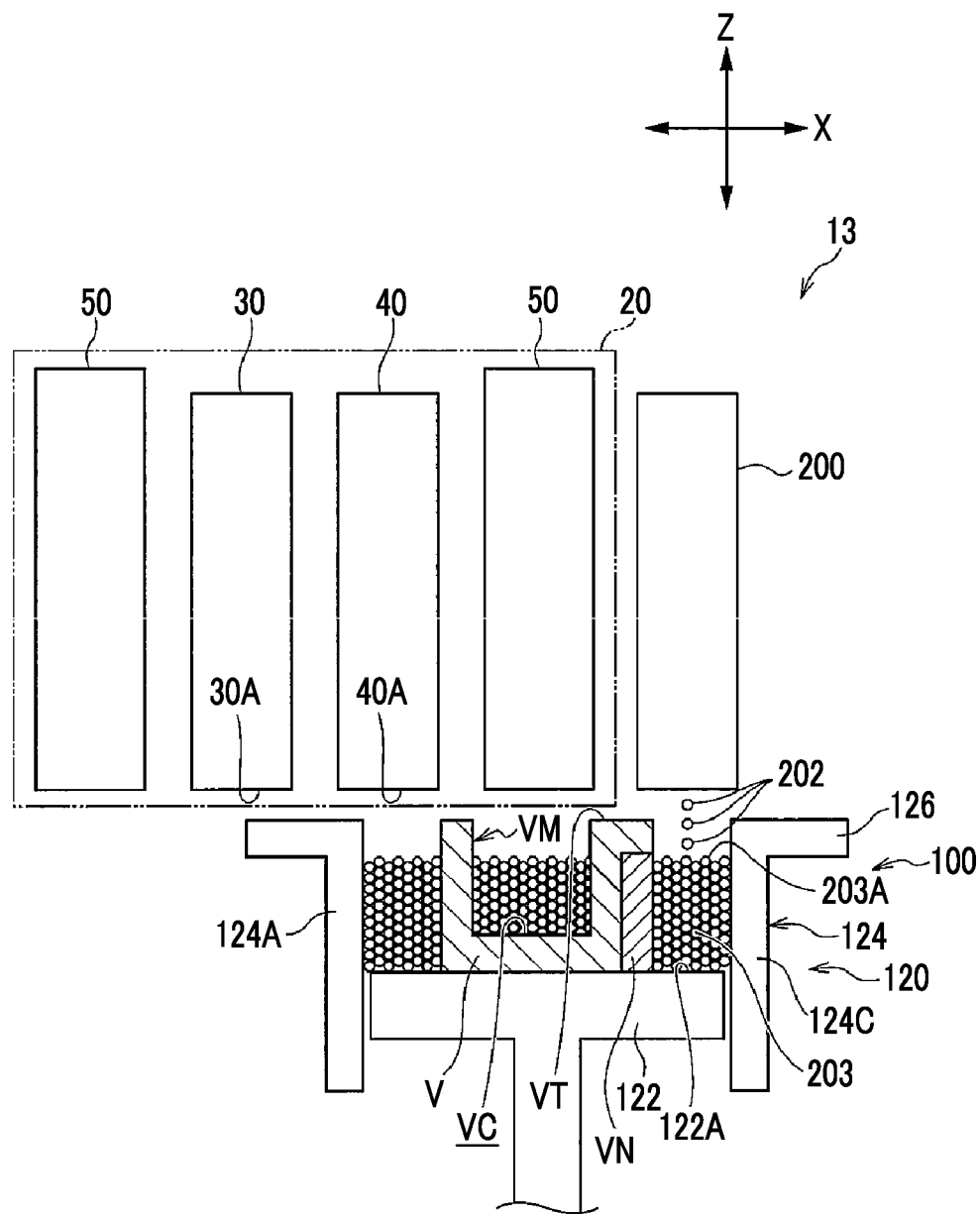
FIG. 10 is a view schematically showing a forming apparatus of a second exemplary embodiment in a state in which balls are supplied, when viewed in the Y direction.
Figure 11:
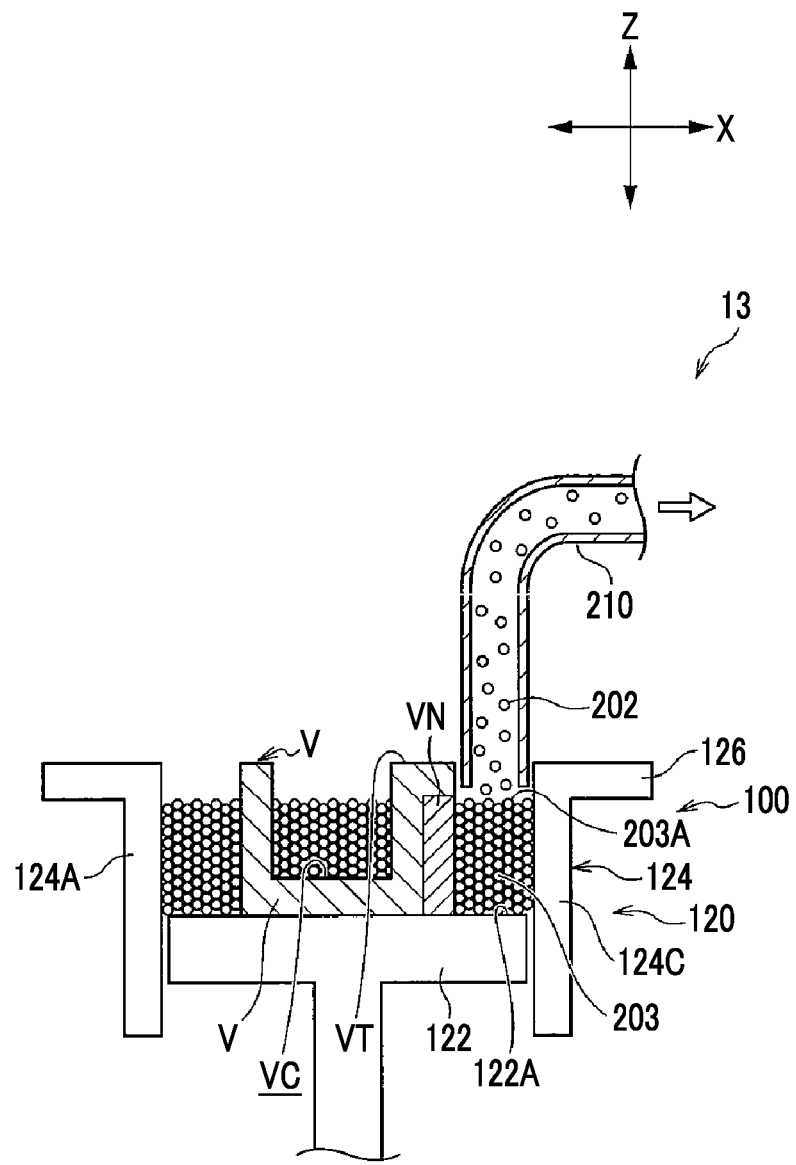
FIG. 11 is a view schematically showing the forming apparatus of the second exemplary embodiment in a state in which the balls are suctioned, when viewed in the Y direction.

As shown in FIG. 10 and FIG. 11, a forming apparatus 13 includes a ball supplying unit 200 (refer to FIG. 10) and a ball collecting unit (refer to FIG. 11). The ball supplying unit 200 (refer to FIG. 10) and a ball collecting unit 210 (refer to FIG. 11) are controlled by the control unit 16 (refer to FIG. 3).

Ball Supplying Unit

As shown in FIG. 10, the ball supplying unit 200 has functions of supplying balls 202 to an inner side of the wall section 124 of the operating section 120 and of providing a reduction section 203 through the accumulation of the balls 202.

The ball 202 is formed of a material having reflectance with which the irradiation beam LA is reflected from the ball and which is lower than that of the three-dimensional object V (the model material and the support material) after the droplet DA and the droplet DB are cured and formed and, in the present exemplary embodiment, the ball 202 is formed of the porous resin such as a black resin sponge. The ball 202 of the present exemplary embodiment is 1 mm to 5 mm in diameter. The ball 202 may not have sphericity, but may be a granulated body.

Ball Collecting Unit

The ball collecting unit 210 shown in FIG. 11 performs suction and collection of the balls 202 supplied to the inner side of the wall section 124 of the operating section 120. The ball supplying unit 200 is refilled with the collected balls 202.

Forming Method of Three-Dimensional Object

Next, an example of a forming method of the three-dimensional object V by the forming apparatus 13 of the present exemplary embodiment will be described.

Similar to the first exemplary embodiment, the ejection of the droplet DA and the droplet DB and the curing of the droplet DA and the droplet DB by the irradiation with the irradiation beam LA are repeated and thereby, the layers LR are stacked on the worktable 122 and the three-dimensional object V is formed.

As shown in FIG. 10, in the present exemplary embodiment, the control unit 16 causes the operating section 120 to appropriately move below the ball supplying unit 200 along with the formation of the three-dimensional object V (depending on the height of the three-dimensional object V) and causes the balls 202 to be supplied to the inner side of the wall section 124 in order and the reduction section 203 is formed. A sensor (not shown) detects an upper end portion 203A of the reduction section 203 which is configured of the accumulated balls 202 and the balls 202 are supplied such that the upper end portion 203A has substantially the same height as the top portion VT of the three-dimensional object V or the upper end portion 203A is slightly lower than the top portion VT. In addition, in the present exemplary embodiment, the balls 202 are supplied to a recessed portion VC at the center of the three-dimensional object V.

Then, when the forming of the three-dimensional object V is completed, as shown in FIG. 11, the control unit 16 causes the operating section 120 to move below the ball collecting unit 210 and causes the ball collecting unit 210 to suction and to collect the balls 202.

Operations

Next, operations of the present exemplary embodiment will be described.

As shown in FIG. 10, the reduction section 203 is provided around the three-dimensional object V and is configured of the balls 202 as the material having reflectance by which the irradiation beam LA is reflected from the balls 202 and which is lower than that of the three-dimensional object V (the model material and the support material). Accordingly, the amount of the reflected beam LB, with which the ejection surface 30A of the model material ejection head 30 and the ejection surface 40A of the support material ejection head 40 are irradiated, is reduced.

In addition, since the reduction section 203 is accumulated along with the formation of the three-dimensional object V and the upper end portion 203A becomes higher (the three-dimensional object V is buried in the reduction section 203 (balls 202)), a portion, in which the three-dimensional object V is exposed, becomes smaller and the reflected beam LB from the three-dimensional object V is reduced. In addition, since the upper end portion 203A of the reduction section 203 becomes higher, the change of the angle θ of the reflected beam LB is small.

Accordingly, the amount of the reflected beam LB, with which the ejection surface 30A of the model material ejection head 30 and the ejection surface 40A of the support material ejection head 40 are irradiated, is reduced, and, as a result, a problem such as the nozzle clogging due to the curing of the model material on the ejection surface 30A of the model material ejection head 30 and the support material on the ejection surface 40A of the support material ejection head 40 is prevented or suppressed.

Third Exemplary Embodiment

A forming apparatus according to the third exemplary embodiment of the invention is described. The same reference sign is assigned to the same member as in the first exemplary embodiment or in the second exemplary embodiment and a repetitive description thereof is omitted.

Operating Mechanism

Figure 12:
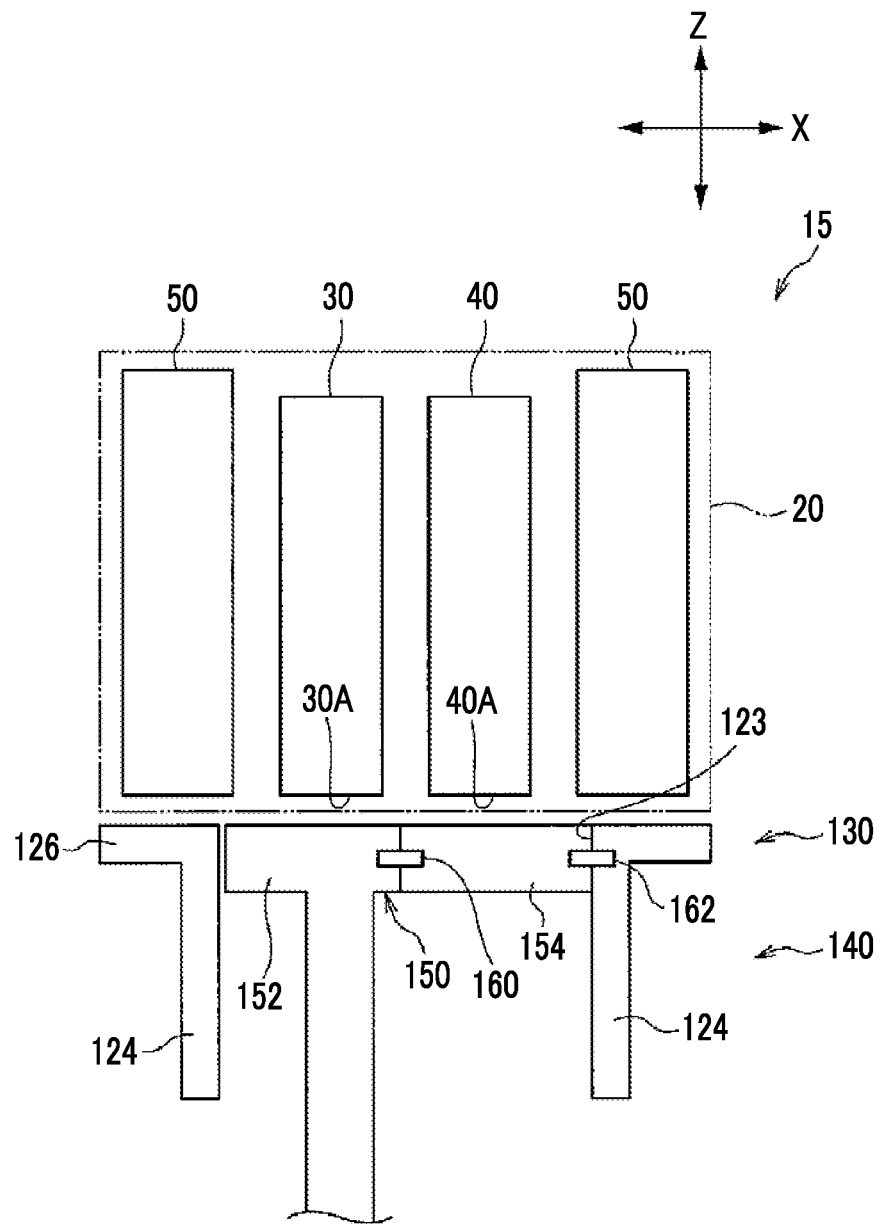
FIG. 12 is a view schematically showing a forming apparatus of a third exemplary embodiment when viewed in the Y direction.
Figure 13:
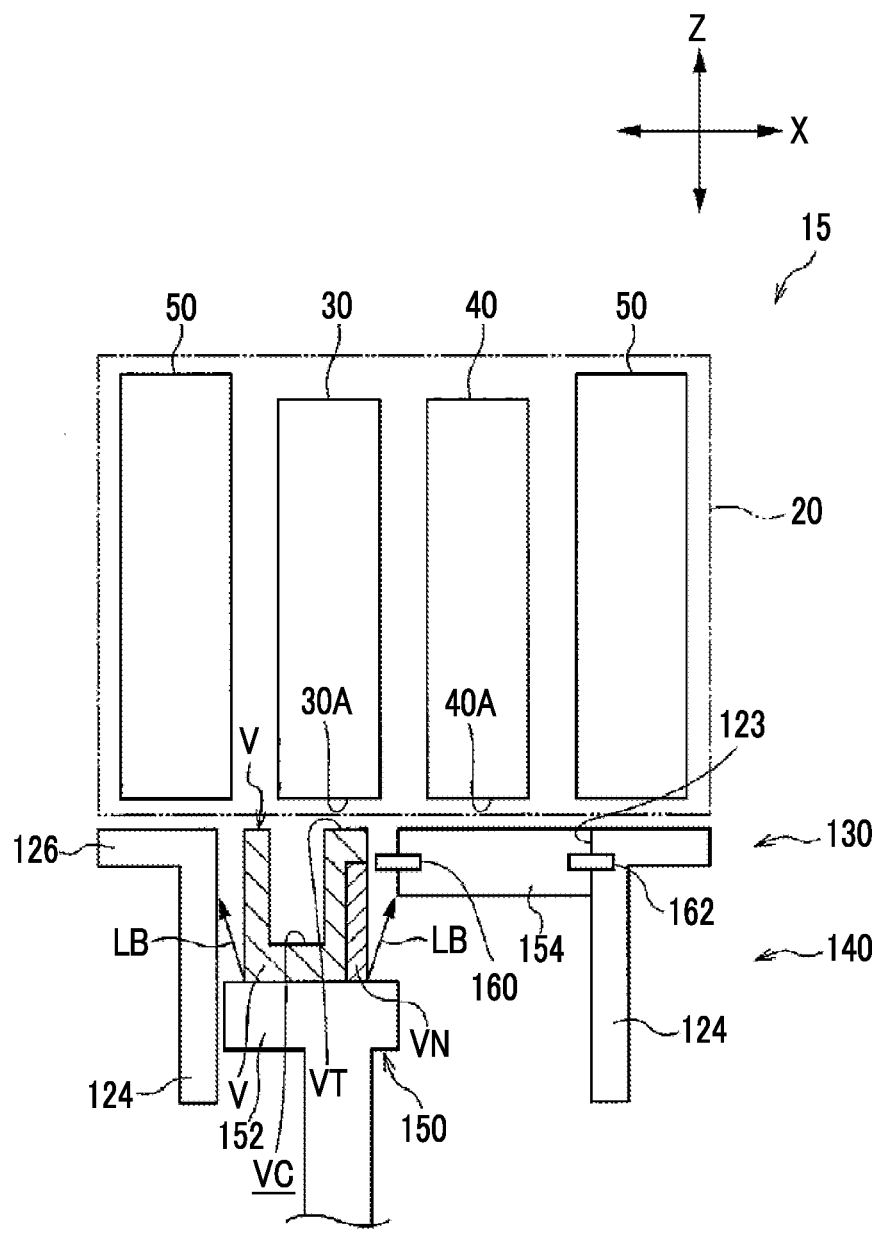
FIG. 13 is a view schematically showing a reflected beam in a state in which a three-dimensional object is small in size and a second worktable is connected to a wall section in the forming apparatus of the third exemplary embodiment, when viewed in the Y direction.
Figure 14:
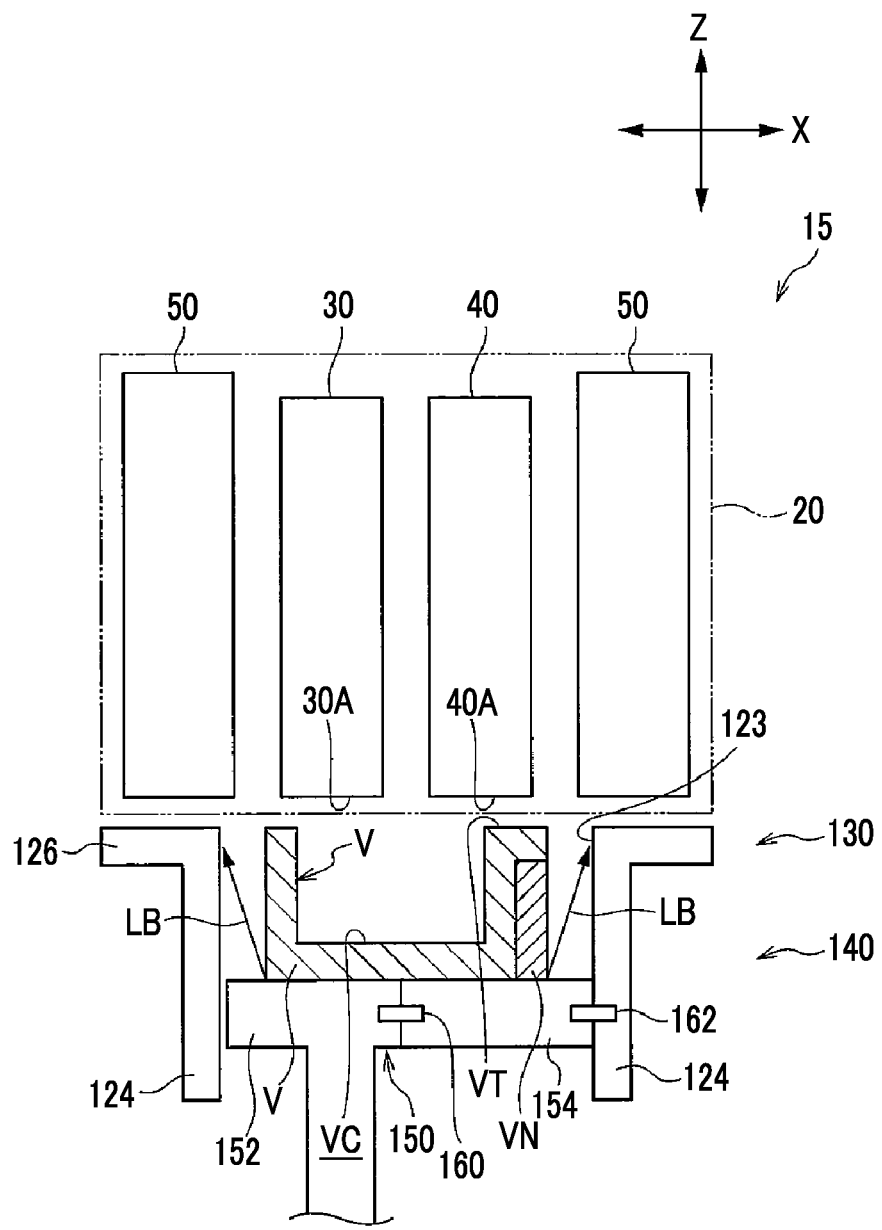
FIG. 14 is a view schematically showing a reflected beam in a state in which a three-dimensional object is large in size and the second worktable is connected to a first worktable in the forming apparatus of the third exemplary embodiment, when viewed in the Y direction.

As shown in FIGS. 12 to 14, an operating mechanism 130 of a forming apparatus 15 is configured to include the drive unit 110 (refer to FIG. 3) and an operating section 140.

Operating Section

As shown in FIGS. 12 to 14, the operating section 140 is configured to include a worktable 150 as an example of a base portion and the wall section 124 provided around the worktable 150.

The worktable 150 has a structure in which the worktable is divided at the center portion into a first worktable 152 and a second worktable 154.

The first worktable 152 and the second worktable 154 are connected using a table-side connection mechanism 160 to be releasable from each other. Further, the second worktable 154 is connected to an upper end portion 123 of the wall section 124 using a wall-side connection mechanism 162 to be releasable from each other. The connections and the connection releases of the table-side connection mechanism 160 and the wall-side connection mechanism 162 are controlled by the control unit 16 (refer to FIG. 3).

Drive Unit

The drive unit 110 shown in FIG. 3 has functions of causing the overall operating section 140 to move in the apparatus width direction (X direction) and the apparatus depth direction (Y direction) and of causing the first worktable 152 of the worktable 150 to move in the apparatus height direction (Z direction).

Forming Method of Three-Dimensional Object

Next, an example of a forming method of the three-dimensional object V by the forming apparatus 15 of the present exemplary embodiment will be described.

Similar to the first exemplary embodiment, the ejection of the droplet DA and the droplet DB and the curing of the droplet DA and the droplet DB by the irradiation with the irradiation beam LA are repeated and thereby, the layers LR are stacked on the worktable 122 and the three-dimensional object V is formed.

As shown in FIG. 13, in a case where the three-dimensional object V is small, the control unit 16 controls the table-side connection mechanism 160 and the wall-side connection mechanism 162 such that the connection between the first worktable 152 and the second worktable 154 is released and the second worktable 154 is connected to the upper end portion 123 of the wall section 124. Then, the control unit 16 causes the three-dimensional object V to be formed on the first worktable 152.

As shown in FIG. 14, in a case where the three-dimensional object V is large, the control unit 16 controls the table-side connection mechanism 160 and the wall-side connection mechanism 162 such that the first worktable 152 and the second worktable 154 are connected to each other and the connection between the second worktable 154 and the upper end portion 123 of the wall section 124 is released. Then, the control unit 16 causes the three-dimensional object V to be formed on the first worktable 152 and the second worktable 154.

Operations

Next, operations of the present exemplary embodiment will be described.

As shown in FIG. 13, in the case where the three-dimensional object V is small, the connection between the first worktable 152 and the second worktable 154 is released and the second worktable 154 is connected to the upper end portion 123 of the wall section 124. Then, the second worktable 154 is in a state of extending from the upper end portion 123 of the wall section 124 without being lowered with the first worktable 152 along with the formation of the three-dimensional object V.

Accordingly, the second worktable 154 is separated from the first worktable 152 with a distance increasing along with the formation of the three-dimensional object V. In other words, the second worktable 154 is disposed at a position, at which the reflected beam LB is blocked, corresponding to the change of the angle θ of the reflected beam LB toward the ejection surface 30A of the model material ejection head 30 and the ejection surface 40A of the support material ejection head 40 along with the formation of the three-dimensional object V.

Accordingly, since the reflected beam LB, with which the ejection surface 30A of the model material ejection head 30 and the ejection surface 40A of the support material ejection head 40 are irradiated, is blocked, the amount of the reflected beam LB is reduced, and, as a result, a problem such as the nozzle clogging due to the curing of the model material on the ejection surface 30A of the model material ejection head 30 and the support material on the ejection surface 40A of the support material ejection head 40 is prevented or suppressed.

In the present exemplary embodiment, the worktable 150 is divided into the first worktable 152 and the second worktable 154; however, the worktable 150 is not limited thereto.

Figure 15:
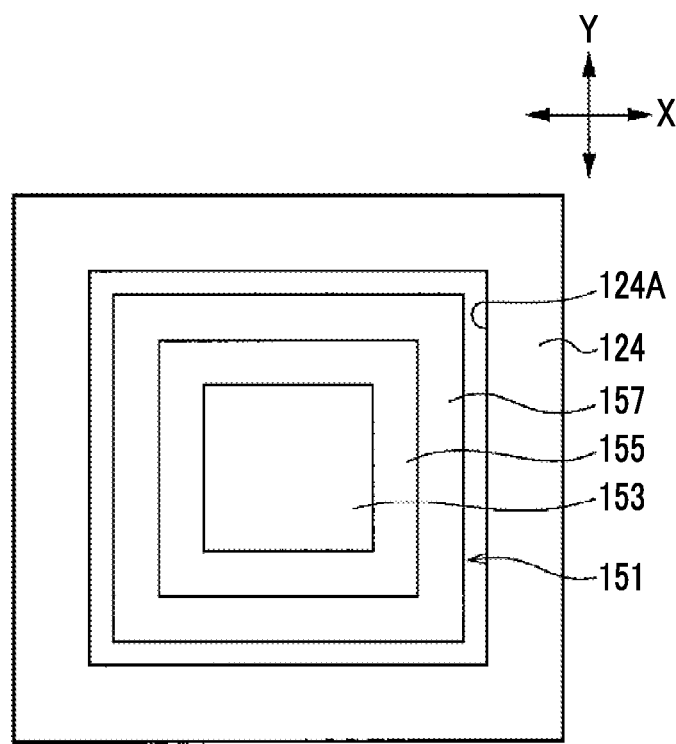
FIG. 15 is a view schematically showing a modification example of the forming apparatus of the third exemplary embodiment when viewed in the Z direction.

In addition, as shown in FIG. 15, a worktable 151 may be divided into a rectangular first worktable 153, a second worktable 155 having a rectangular frame shape on the outer side of the first worktable 153, and a third worktable 157 having a rectangular frame shape on the outer side of the second worktable 155. In the case of the worktable 151, the table-side connection mechanism (not shown) includes a first mechanism that connects the first worktable 153 and the second worktable 155 to be releasable and a second mechanism the connects the second worktable 155 and the third worktable 157 to be releasable. In addition, the wall-side connection mechanism (not shown) connects the third worktable 157 and the upper end portion 123 of the wall section 124 to be releasable.

Fourth Exemplary Embodiment

A forming apparatus according to the fourth exemplary embodiment of the invention is described. The same reference sign is assigned to the same member as in the first to third exemplary embodiments and a repetitive description thereof is omitted.

Operating Mechanism

Figure 16:
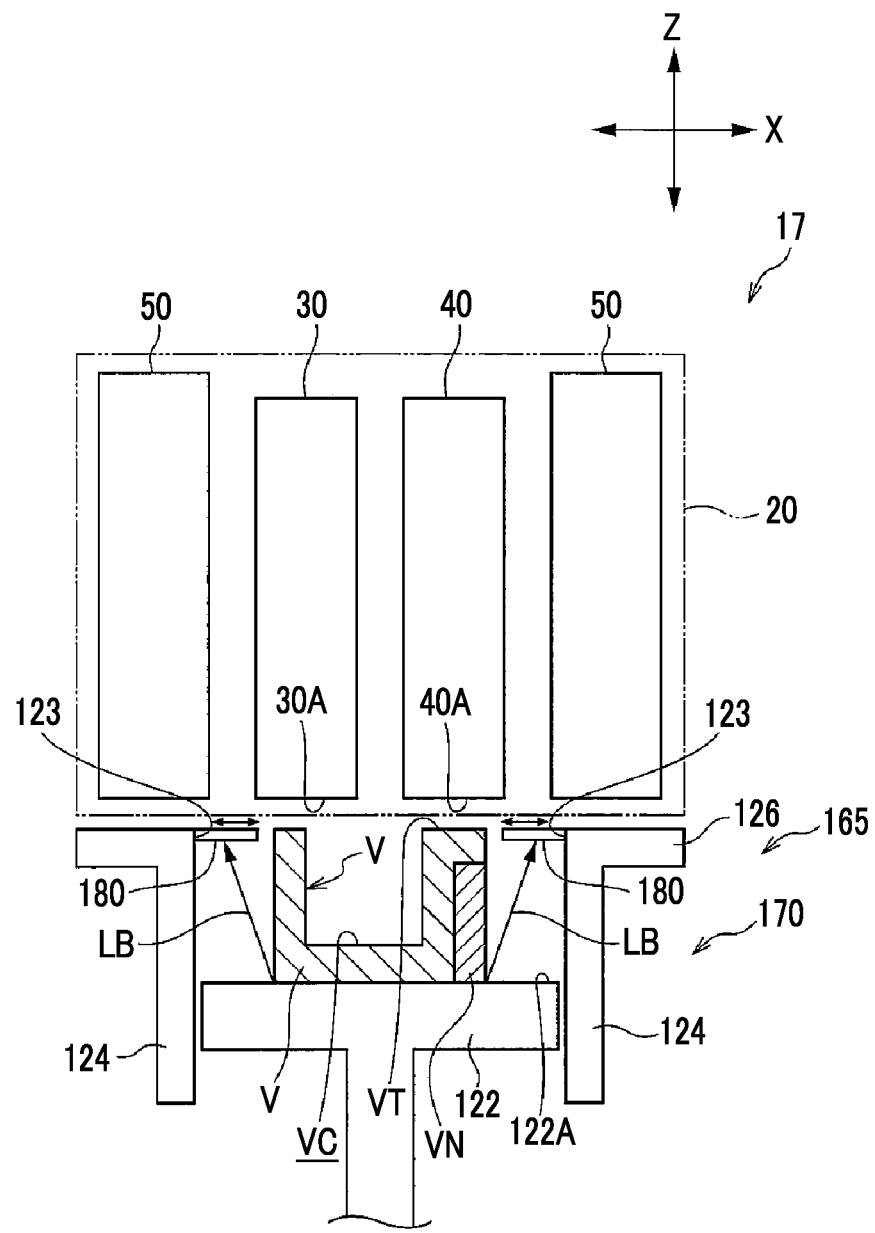
FIG. 16 is a view schematically showing a forming apparatus of a fourth exemplary embodiment when viewed in the Y direction.

As shown in FIG. 16, an operating mechanism 165 of a forming apparatus 17 is configured to include the drive unit 110 (refer to FIG. 3) and an operating section 170.

Operating Section

As shown in FIG. 16, a shutter 180 which slides in the X direction is provided on the upper end portion 123 of the wall section 124 provided around the worktable 122 of the operating section 170. The shutter 180 is controlled to slide by the control unit 16.

Forming Method of Three-Dimensional Object

Next, an example of a forming method of the three-dimensional object V by the forming apparatus 17 of the present exemplary embodiment will be described.

Similar to the first exemplary embodiment, the ejection of the droplet DA and the droplet DB and the curing of the droplet DA and the droplet DB by the irradiation with the irradiation beam LA are repeated and thereby, the layers LR are stacked on the worktable 122 and the three-dimensional object V is formed.

In addition, as shown in FIG. 16, the control unit 16 causes the shutter 180 to slide corresponding to the size of the three-dimensional object V.

Operations

Next, operations of the present exemplary embodiment will be described.

The shutter 180 slides and extends from the upper end portion 123 of the wall section 124, corresponding to the size of the three-dimensional object V.

Accordingly, the shutter 180 is separated from the worktable 122 with a distance increasing along with the formation of the three-dimensional object V. In other words, the shutter 180 is disposed at a position at which the reflected beam LB is blocked, corresponding to the change of the angle θ of the reflected beam LB toward the ejection surface 30A of the model material ejection head 30 and the ejection surface 40A of the support material ejection head 40 along with the formation of the three-dimensional object V.

Accordingly, since the reflected beam LB, with which the ejection surface 30A of the model material ejection head 30 and the ejection surface 40A of the support material ejection head 40 are irradiated, is blocked, the amount of the reflected beam LB is reduced, and, as a result, a problem such as the nozzle clogging due to the curing of the model material on the ejection surface 30A of the model material ejection head 30 and the support material on the ejection surface 40A of the support material ejection head 40 is prevented or suppressed.

Other Exemplary Embodiments

The exemplary embodiment of the invention is not limited to the exemplary embodiments described above.

For example, in the exemplary embodiments described above, the model material and the support material mean the ultraviolet beam curing type forming liquid which is cured by being irradiated with the ultraviolet beam; however, the materials are not limited thereto. The forming liquid may be cured by being irradiated with a beam other than the ultraviolet beam. The forming liquid appropriately corresponds to the irradiation unit 50 which emits a beam corresponding to the forming liquid.

For example, in the exemplary embodiments described above, all of the operating sections 120, 140, and 170 move in the X direction and the Y direction and the worktables 122 and 150 move in the Z direction such that the three-dimensional object V (three-dimensional object VM) is formed; however, the operation is not limited thereto. The forming unit 20 may move in the X direction, the Y direction, and the Z direction, and may form the three-dimensional object V. Alternatively, the forming unit 20 may move in the X direction and the Y direction, and the worktables 122 and 150 may move in the Z direction. In short, in a structure, the worktables 122 and 150, and the model material ejection head 30 and the support material ejection head 40 which constitute the forming unit 20, may move relatively to one another in the X direction, the Y direction, and the Z direction.

In addition, the configuration of the forming apparatus 10, 13, 15, or 17 is not limited to the configurations of the exemplary embodiments described above but various configurations may be employed. In addition, the structures of multiple exemplary embodiments may be combined.

Further, it is needless to say that the invention may be embodied in various ways within a scope which does not depart from the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A forming apparatus comprising:
   an operating section that includes a base portion;
   a forming unit that includes an ejection unit having an ejection surface configured to eject a droplet of a light curing forming liquid toward the base portion,
      wherein the forming unit is configured to move relatively with respect to the base portion, and
      wherein the forming unit is configured to form a three-dimensional object on the base portion by repeating both of ejection of the droplet and curing the droplet with an irradiation beam; and
   a controller configured to control the forming unit to form a reduction section configured to reduce an amount of light reflected toward the ejection surface, around the three-dimensional object in the operating section,
   wherein the operating section includes a wall section that surrounds the three-dimensional object, and
   wherein the reduction section comprises an extension section that extends to the three-dimensional object side from the wall section and that is separated from the base portion with a distance increasing along with formation of the three-dimensional object.

2. The forming apparatus according to claim 1, wherein the worktable is coated in black.

3. The forming apparatus according to claim 2, wherein the worktable is provided with a matte finish.

4. The forming apparatus according to claim 1, wherein the controller is configured to control the forming unit to form the reduction section in response to determining that the amount of light reflected toward the ejection surface would be greater than or equal to a preset beam amount.

* * * * *